US012812201B2

(12) United States Patent
de Boursetty et al.

(10) Patent No.: US 12,812,201 B2
(45) **Date of Patent: *Nov. 24, 2026**

(54) METHODS, SYSTEMS, AND MEDIA FOR SYNCHRONIZED MEDIA CONTENT PLAYBACK ON MULTIPLE DEVICES

(71) Applicant: Google LLC, Mountain View, CA (US)

(72) Inventors: Benoît de Boursetty, Santa Monica, CA (US); Joe Bertolami, Culver City, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/061,959

(22) Filed: Feb. 24, 2025

(65) Prior Publication Data

US 2025/0193476 A1 Jun. 12, 2025

Related U.S. Application Data

(63) Continuation of application No. 18/236,151, filed on Aug. 21, 2023, now Pat. No. 12,238,363, which is a (Continued)

(51) Int. Cl.
*H04N 21/43* (2011.01)
*H04N 21/234* (2011.01)

(52) U.S. Cl.
CPC ....... *H04N 21/4302* (2013.01); *H04N 21/234* (2013.01)

(58) Field of Classification Search
CPC ............. H04N 21/234; H04N 21/4302; H04N 21/43076; H04N 21/47217
See application file for complete search history.

(56) References Cited

U.S. PATENT DOCUMENTS 4,453,259 A * 6/1984 Miller .................... H04L 7/0029 327/161
5,241,428 A * 8/1993 Goldwasser ......... H04N 5/4448 386/E5.067

(Continued)

FOREIGN PATENT DOCUMENTS

CN 102742249 A 10/2012
CN 103327377 A 9/2013

(Continued)

OTHER PUBLICATIONS

International Search Report and Written Opinion for International Application No. PCT/US2018/029128, mailed Nov. 13, 2018, 12 Pages.

(Continued)

*Primary Examiner* — Michael B. Pierorazio
(74) *Attorney, Agent, or Firm* — Lowenstein Sandler LLP

(57) ABSTRACT

A method for synchronizing media content playback on multiple devices includes receiving a first request of a first user device of a first user to concurrently watch a media item with at least one second user of a second user device, receiving a first communication from the first user device to begin presenting the media item on the first user device, receiving a second communication from the second user device to begin presenting the media item on the second user device, in response to receiving the first communication and the second communication, initiating a synchronized media playback session, in response to a first request of the second user to pause playback of the media item on the second user device, causing a rate of delivery of the media item to the second user device to be changed from a first rate of delivery to a second rate of delivery, and in response to a second request of the second user to resume playback of the media item on the second user device, causing the second rate of delivery of the media item to the second user device to be (Continued)

changed to a third rate of delivery to allow the second user device to catch up to the first user device in the synchronized media playback session.

20 Claims, 4 Drawing Sheets

Related U.S. Application Data continuation of application No. 16/976,619, filed as application No. PCT/US2018/029128 on Apr. 24, 2018, now Pat. No. 11,736,755.

(56) References Cited

U.S. PATENT DOCUMENTS 5,329,320 A * 7/1994 Yifrach .................... H04N 5/60 348/730
5,467,137 A * 11/1995 Zdepski ........... H04N 21/23608 375/E7.278
5,486,864 A * 1/1996 Zdepski ............. H04N 21/2389 375/E7.278
5,592,551 A * 1/1997 Lett .................... H04N 21/8166 348/E7.071
5,808,662 A * 9/1998 Kinney ............. H04N 7/17336 725/89
6,169,843 B1 * 1/2001 Lenihan ............... H04N 9/8042 348/E5.005
6,215,774 B1 * 4/2001 Knauerhase .............. H04L 1/20 370/252
6,233,389 B1 * 5/2001 Barton ............... H04N 21/4147 386/E5.07
6,233,695 B1 * 5/2001 Ahn ................... H04N 21/4341 713/400
6,269,122 B1 * 7/2001 Prasad ..................... H04N 5/04 386/E5.028
6,300,863 B1 * 10/2001 Cotichini ................ H04L 41/28 709/200
6,341,278 B1 * 1/2002 Yamamoto .............. G06F 3/065 386/E5.013
6,598,172 B1 * 7/2003 VanDeusen ........ H04N 21/4347 375/E7.278
6,611,537 B1 * 8/2003 Edens ................ H04N 21/4363 375/E7.274
6,622,171 B2 * 9/2003 Gupta ................... H04L 65/764 709/219
6,741,290 B1 * 5/2004 Wells ............... H04N 21/23608 375/E7.022
6,985,966 B1 * 1/2006 Gupta ................ H04N 21/4341 715/725
6,996,624 B1 * 2/2006 LeCroy ................... H04L 47/36 709/224
7,023,924 B1 * 4/2006 Keller .............. H04N 21/23424 375/240.26
7,113,983 B1 * 9/2006 Terada ................. H04N 21/816 709/219
7,269,338 B2 * 9/2007 Janevski .................. H04N 5/76 386/222
7,344,084 B2 * 3/2008 DaCosta ............ H04N 21/4126 348/E7.071
7,712,125 B2 * 5/2010 Herigstad .......... H04N 21/4755 725/38
7,987,491 B2 * 7/2011 Reisman ............ H04N 21/8586 725/86
8,190,683 B2 5/2012 Sloo et al.
8,752,100 B2 * 6/2014 Ramakrishnan ..... H04N 21/262 725/100
9,674,239 B2 6/2017 Wong et al.
10,802,689 B2 * 10/2020 Lewis ................... G06F 16/487
2002/0056129 A1 * 5/2002 Blackketter ........ H04N 21/2665 348/E7.071
2002/0118199 A1 * 8/2002 Mukherjee ............ G06F 3/1438 713/400
2003/0091322 A1 * 5/2003 Van Der Schaar .......................... H04N 21/4147
2003/0135632 A1 * 7/2003 Vrzic .................... H04W 28/02 709/231
2004/0031058 A1 * 2/2004 Reisman .......... H04N 21/47208 348/E7.071
2004/0226050 A1 * 11/2004 Matsuzaki ......... H04N 21/8547 725/135
2004/0227855 A1 * 11/2004 Morel .................... H04N 5/073 348/E5.014
2005/0028200 A1 * 2/2005 Sardera ............. H04N 21/4263 725/39
2005/0174941 A1 * 8/2005 Shanley .................. H04L 47/10 370/235
2005/0216731 A1 * 9/2005 Saito ................ H04N 21/25816 713/153
2005/0249240 A1 * 11/2005 Boyce .................... H04N 19/67 370/252
2005/0262261 A1 * 11/2005 Deshpande ............. H04L 65/80 709/231
2006/0031914 A1 * 2/2006 Dakss .............. H04N 21/23614 725/135
2006/0072596 A1 * 4/2006 Spilo .................. H04N 21/4382 375/E7.023
2006/0093317 A1 * 5/2006 Law ....................... G09G 5/008 386/343
2006/0149850 A1 7/2006 Bowman
2006/0227796 A1 * 10/2006 Wei ......................... H04L 47/56 370/412
2008/0134258 A1 * 6/2008 Goose .................. H04N 21/632 725/91
2010/0083324 A1 4/2010 Smith et al.
2010/0100917 A1 * 4/2010 Chiao .............. H04N 21/43076 725/110
2010/0303100 A1 * 12/2010 Niamut ................... H04L 65/80 370/503
2012/0002111 A1 * 1/2012 Sandoval ................. H04N 5/06 348/521
2012/0079541 A1 * 3/2012 Pan .................... H04N 21/4302 725/62
2012/0144435 A1 * 6/2012 Spilo ................ H04N 21/43615 725/78
2012/0311043 A1 12/2012 Chen et al.
2014/0359681 A1 * 12/2014 Amidei .............. H04N 21/4302 725/93
2015/0120953 A1 * 4/2015 Crowe ............... H04N 21/6547 709/231
2017/0353747 A1 12/2017 Thomas et al.
2018/0103078 A1 4/2018 Goswami et al.
2018/0109826 A1 4/2018 McCoy et al.
2018/0160192 A1 * 6/2018 Wu .................... H04N 21/4302
2018/0167631 A1 * 6/2018 Schulze ............. H04N 21/4302
2019/0268669 A1 * 8/2019 Song .................... H04N 21/437
2021/0243236 A1 * 8/2021 Shamma ............ H04N 21/4147

FOREIGN PATENT DOCUMENTS

CN 103442293 A 12/2013
CN 106341714 A 1/2017
CN 106358065 A 1/2017
JP 2005294941 A 10/2005

OTHER PUBLICATIONS

Nunome T., et al., "An Application-level QoS Comparison Of Inter-destination Synchronization Schemes For Continuous Media Multicasting", In Proceedings of the IEEE Conference and Exhibition on Global Telecommunications, Dec. 2003, pp. 3602-3608.
Office Action for Chinese Patent Application No. 201880090984.3, mailed Jul. 4, 2022, 14 Pages.
Office Action for Chinese Patent Application No. 201880090984.3, mailed Nov. 19, 2021, 20 Pages.
Office Action for European Patent Application No. EP18723324.2, mailed Jun. 21, 2022, 4 Pages.

(56) References Cited

OTHER PUBLICATIONS

Extended European Search Report for European Application No. 24210927.0, mailed Mar. 20, 2025, 10 Pages.

* cited by examiner

METHODS, SYSTEMS, AND MEDIA FOR SYNCHRONIZED MEDIA CONTENT PLAYBACK ON MULTIPLE DEVICES

CROSS-REFERENCE TO RELATED APPLICATIONS

This application is a continuation of U.S. patent application Ser. No. 18/236,151, filed Aug. 21, 2023, which is a continuation of U.S. patent application Ser. No. 16/976,619, filed Aug. 28, 2020, now U.S. Pat. No. 11,736,755, which is the national stage application under 35 U.S.C. § 371 of International Patent Application No. PCT/US2018/029128, filed Apr. 24, 2018, each of which is incorporated herein by reference.

TECHNICAL FIELD

The disclosed subject matter relates to methods, systems, and media for synchronized media content playback on multiple devices.

BACKGROUND

People frequently watch media content, such as videos, downloaded or streamed from a server, such as a server associated with a video sharing service. Additionally, people may want to watch media content with other people, such as friends, simultaneously, but on separate devices. It can, however, be difficult to synchronize playback of media content across multiple devices.

Accordingly, it is desirable to provide new methods, systems, and media for synchronized media content playback on multiple devices.

SUMMARY

Methods, systems, and media for synchronized media content playback on multiple devices are provided.

In accordance with some embodiments of the disclosed subject matter, a method for synchronizing playback of media content is provided, the method comprising: receiving, at a server, a first request to present a media content item from a first user device and a second request to present the media content item from a second user device; transmitting, from the server to the first user device and to the second user device, media content data corresponding to the media content item for storage on the first user device and the second user device; receiving, at a first time point, a message from the first user device that includes an indication that the first user device has buffered a predetermined amount of the media content data and a request to begin presenting the media content item on the first user device; receiving, at a second time point, a message from the second user device that includes an indication that the second user device has buffered the predetermined amount of the media content data and a request to begin presenting the media content item on the second user device; and, in response to determining that the first user device and the second user device have each buffered the predetermined amount of the media content data, transmitting instructions to the first user device and to the second user device that cause the first user device and the second user device to begin presenting the media content item.

In some embodiments, the method further comprises, in response to determining that the first user device has buffered the predetermined amount of the media content data and in response to determining that the second user device has not buffered the predetermined amount of the media content data, transmitting a message to the first user device indicating the presentation of the media content item is not to begin.

In some embodiments, the method further comprises: receiving, from a third user device, after transmitting instructions to the first user device and the second user device that cause the first user device and the second user device to begin presenting the media content item, a request to join presentation of the media content item; determining a playback position from which the third user device is to begin presentation of the media content item, wherein the first user device and the second user device have not yet reached the playback position; transmitting media content data that corresponds to media content after the playback position to the third user device; and transmitting instructions to the third user device to begin presentation of the media content item from the playback position at a specified time.

In some embodiments, transmitting the instructions to the third user device to begin presentation of the media content item is in response to receiving an indication from the third user device that a second predetermined amount of the media content data that corresponds to media content after the playback position has been buffered by the third user device.

In some embodiments, the method further comprises: receiving, from the first user device, an indication that additional media content data is to be buffered by the first user device; transmitting the additional media content data to the first user device; and transmitting instructions to the first user device to speed up playback of the media content item for a predetermined duration of time.

In some embodiments, the method further comprises: receiving, from the first user device, an indication that additional media content data is to be buffered by the first user device; transmitting the additional media content data to the first user device; and transmitting instructions to the second user device to slow down playback of the media content item for a predetermined duration of time.

In accordance with some embodiments of the disclosed subject matter, a system for synchronizing playback of media content is provided, the system comprising a memory and a hardware processor that, when executing computer executable instructions stored in the memory, is configured to: receive, at a server, a first request to present a media content item from a first user device and a second request to present the media content item from a second user device; transmit, from the server to the first user device and to the second user device, media content data corresponding to the media content item for storage on the first user device and the second user device; receive, at a first time point, a message from the first user device that includes an indication that the first user device has buffered a predetermined amount of the media content data and a request to begin presenting the media content item on the first user device; receive, at a second time point, a message from the second user device that includes an indication that the second user device has buffered the predetermined amount of the media content data and a request to begin presenting the media content item on the second user device; and, in response to determining that the first user device and the second user device have each buffered the predetermined amount of the media content data, transmit instructions to the first user device and to the second user device that cause the first user device and the second user device to begin presenting the media content item. Another embodiment of the disclosed subject matter provides a system for synchronizing playback of media content is provided, the system comprising a memory and a hardware processor that, when executing computer executable instructions stored in the memory, is configured to perform a method according to any aspect or embodiment described herein.

In accordance with some embodiments of the disclosed subject matter, a non-transitory computer-readable medium containing computer executable instructions that, when executed by a processor, cause the processor to perform a method for synchronizing playback of media content is provided, the method comprising: receiving, at a server, a first request to present a media content item from a first user device and a second request to present the media content item from a second user device; transmitting, from the server to the first user device and to the second user device, media content data corresponding to the media content item for storage on the first user device and the second user device; receiving, at a first time point, a message from the first user device that includes an indication that the first user device has buffered a predetermined amount of the media content data and a request to begin presenting the media content item on the first user device; receiving, at a second time point, a message from the second user device that includes an indication that the second user device has buffered the predetermined amount of the media content data and a request to begin presenting the media content item on the second user device; and, in response to determining that the first user device and the second user device have each buffered the predetermined amount of the media content data, transmitting instructions to the first user device and to the second user device that cause the first user device and the second user device to begin presenting the media content item. Another embodiment of the disclosed subject matter provides a computer-readable medium (which may be a transitory or non-transitory medium) containing computer executable instructions that, when executed by a processor, cause the processor to perform a method according to any aspect or embodiment described herein.

In accordance with some embodiments of the disclosed subject matter, a system for synchronizing playback of media content is provided, the system comprising: means for receiving, at a server, a first request to present a media content item from a first user device and a second request to present the media content item from a second user device; means for transmitting, from the server to the first user device and to the second user device, media content data corresponding to the media content item for storage on the first user device and the second user device; means for receiving, at a first time point, a message from the first user device that includes an indication that the first user device has buffered a predetermined amount of the media content data and a request to begin presenting the media content item on the first user device; means for receiving, at a second time point, a message from the second user device that includes an indication that the second user device has buffered the predetermined amount of the media content data and a request to begin presenting the media content item on the second user device; and means for transmitting instructions to the first user device and to the second user device that cause the first user device and the second user device to begin presenting the media content item in response to determining that the first user device and the second user device have each buffered the predetermined amount of the media content data.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
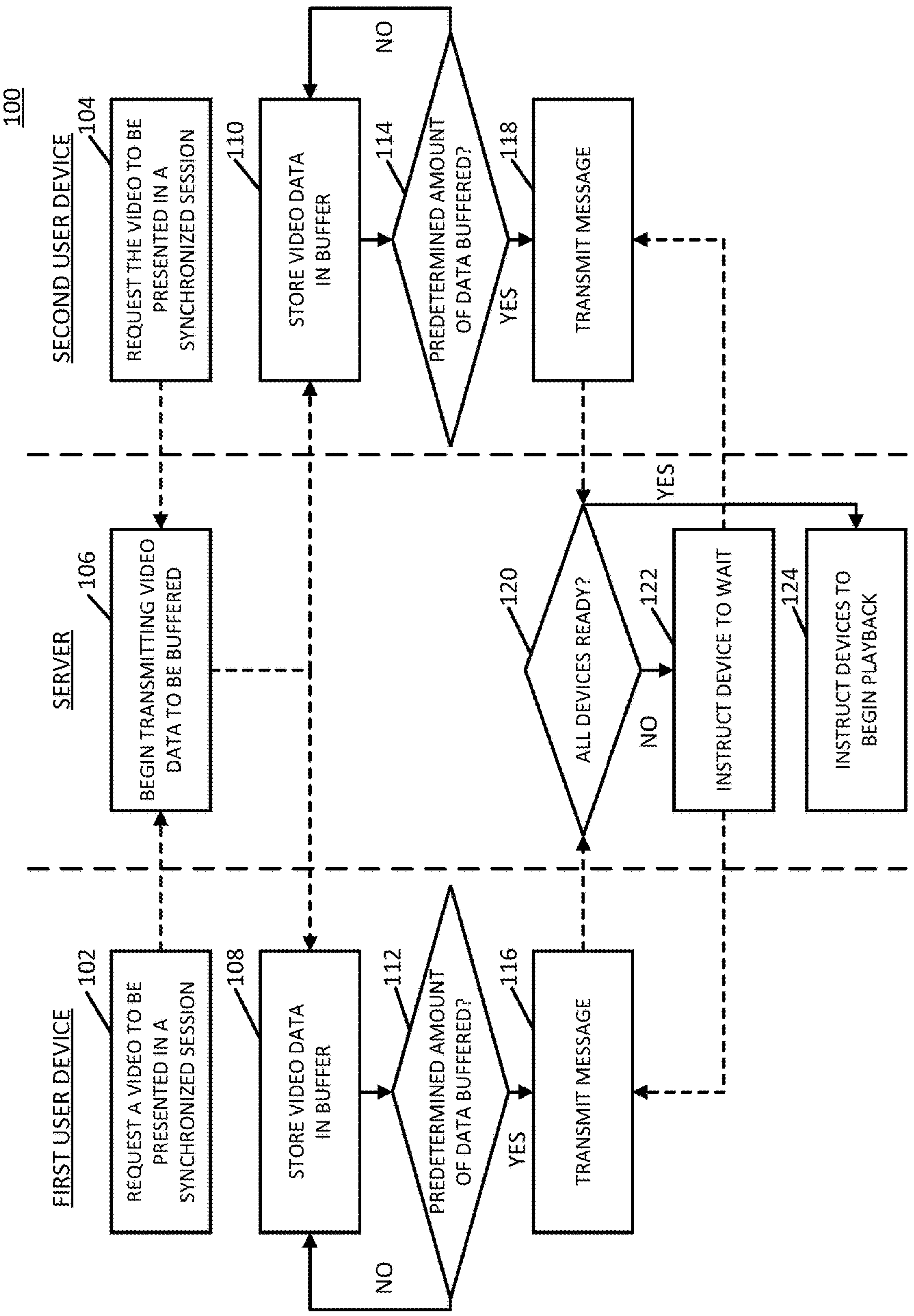
FIG. 1 shows an example of an information flow diagram for synchronized media content playback on multiple devices in accordance with some embodiments of the disclosed subject matter.

In accordance with various embodiments, mechanisms (which can include methods, systems, and media) for synchronized media content playback on multiple devices are provided.

In some embodiments, the mechanisms described herein can synchronize playback of a media content item across multiple user devices that is presented in a synchronized media playback session. In some embodiments, a synchronized media playback session across multiple user devices can include any suitable features or combination of features. For example, in some embodiments, a synchronized media playback session can allow each user device of the multiple user devices to simultaneously present a particular media content item, as described above. As another example, in some embodiments, a synchronized media playback session can allow a series of media content items (e.g., a playlist of media content items, and/or any other suitable collection of media content items) to be simultaneously presented on each user device of the multiple user devices. As yet another example, in some embodiments, a synchronized media playback session can allow a user device participating in the synchronized media playback session to select a video, pause a video, and/or switch to a different video, and can cause the action performed by the user device to be mirrored on the other user devices participating in the session without the user device needing to send commands to each other user device separately.

In some embodiments, a server can receive requests from multiple user devices to initiate and/or join a synchronized media playback session. In some embodiments, the server can begin transmitting media content data corresponding to a media content item to be presented in the synchronized media playback session to each of the user devices. In some embodiments, each user device can store the received media content data in a buffer. In some embodiments, each user device can transmit a message to the server indicating that a predetermined amount of data has been buffered once the predetermined amount of data has been buffered. In some embodiments, each of the user devices can subsequently poll the server at any suitable frequency (e.g., 1 Hz, 2 Hz, and/or any other suitable frequency) to determine whether playback of the media content item is to begin. In some embodiments, the server can respond to each poll from each user device by determining whether all of the user devices have buffered the predetermined amount of data, and can respond to each user device accordingly. For example, in some embodiments, in response to determining that not all user devices have buffered the predetermined amount of data, the server can transmit a message to each polling user device that indicates that playback is not to begin. Conversely, in some embodiments, in response to determining that all of the user devices have buffered the predetermined amount of data, the server can transmit a message to each user device that instructs each user device to begin presentation of the media content item, thereby causing presentation of the media content item to be synchronized across all of the user devices participating in the synchronized media playback session.

In some embodiments, the mechanisms described herein can maintain synchrony of presentation of media content items within a synchronized media playback session using any suitable technique or combination of techniques. For example, in some embodiments, in response to determining that a user device participating in the session paused playback of a media content item (e.g., while buffering additional media content data required for presentation of the media content item), the mechanisms can cause playback of the media content item to be adjusted to maintain synchrony across all user devices during playback. As a more particular example, in some embodiments, the mechanisms can cause playback to be sped up on the user device that paused presentation of the media content item, and/or can cause playback to be slowed down on the other user devices, and/or can cause playback to be adjusted in any other suitable manner. As another example, in some embodiments, the mechanisms can allow a new user device to join in an existing synchronized media playback session by causing the new user device to begin buffering media content data from a future playback position, thereby allowing the new user device to join the synchronized presentation of a media content item.

In conventional video streaming, a content server providing the streamed video provides rate control so that the streamed video is delivered to a user device at a rate and quality that the user device can handle. To allow this, the user device may provide the content server with information about parameters such as how quickly the user device can decode and process the received video, the bandwidth and/or latency of the network over which the video is being streamed to the user device, and the quality of the received video. The content server may adjust the rate of delivery of the video to the client device based on the information received from the client device. Aspects of the present disclosure provide coordinated rate control during streaming of a video content item to multiple client devices. The rate control is "coordinated" in that the rate of streaming to one particular user device is determined based on information supplied to the content server by at least one other user device as well as the particular user device concerned. This may provide improved delivery of the video to the multiple user devices. In many cases a server that is providing content for delivery to multiple user devices (known as "co-watching") will use a third-party streaming platform, and has no control over the rate (or respective rates) at which the content is streamed to the multiple user devices. Moreover, even if the conventional rate control techniques can be applied to streaming of content to multiple user devices, these techniques will apply independent rate control to each client device. This can lead to user devices having to pause playback in order to re-buffer, experiencing additional synchronization delays, and/or experiencing lower video quality than could be provided.

Additionally, as noted above, a synchronized media playback session can allow a user device participating in the synchronized media playback session to select a video, pause a video, and/or switch to a different video, and can cause the action performed by the user device to be mirrored on the other user devices participating in the session. This may be achieved without the user device needing communicate with each other user device separately-when the particular user device informs the content server that it has selected a video, paused a video, and/or switched to a different video, the content server may adjust the delivery of streamed content to all other user device in the same way.

Turning to FIG. 1, an example 100 of an information flow diagram for synchronized media content playback on multiple devices is shown in accordance with some embodiments of the disclosed subject matter. As illustrated, in some embodiments, blocks of process 100 can be performed on a first user device, a second user device, and a server. Note that, although the information flow diagram shown in FIG. 1 and described below generally describes synchronized presentation of a video, in some embodiments, the techniques described below can be used to present any suitable type of media content (e.g., a video, a movie, a television program, live-streamed video content, live-streamed audio content, music, an audiobook, and/or any other suitable type of media content).

At 102, the first user device can request a video to be presented in a synchronized playback session from the server, such as a content server. In some embodiments, the request can be initiated on the first user device in any suitable manner. For example, in some embodiments, the request can be initiated in response to a user of the first user device selecting a link to a particular media content item, in response to a user of the first user device selecting a link to initiate a synchronized media playback session of a particular media content item in connection with other user devices (e.g., the second user device), and/or in any other suitable manner. Note that, in some embodiments, a link to a synchronized media playback session can be created by any suitable user device, and can be shared with other user devices in any suitable manner. For example, in some embodiments, a link to a synchronized media playback session can be shared via a message (e.g., an instant message, a text message, an e-mail, a push notification, and/or in any other suitable manner). In another example, in some embodiments, a synchronized media playback session in which a video content item is played back can be created on a first user device, where a list of user accounts associated with other user devices are included as being permitted to join the synchronized media playback session.

Similarly, at 104, the second user device can request the video to be presented in the synchronized playback session from the server and/or can request to join the synchronized media playback session. Similarly to as described above in connection with block 102, in some embodiments, the second user device can request to join and/or initiate the synchronized media playback session through selection of a link, and/or in any other suitable manner. For example, the second user device can accept a request to join a synchronized playback session in which a video content item is to be played back. In another example, the second user device can launch an application and can select a playback session from a list of playback sessions in which video content items are being played back.

Note that, in some embodiments, a synchronized media playback session can be initiated between the first user device and the second user device (and/or any other suitable user devices) that does not yet include a video. In some such embodiments, the first user device and/or the second user device can select a video and/or a series of videos for presentation during the synchronized media playback session in any suitable manner. For example, in some embodiments, a user device can select a particular video from a group of available videos. As another example, in some embodiments, a user device can create a playlist of videos by selecting videos from a group of available videos and/or arranging the videos in an order to be presented during the synchronized media playback session.

At 106, the server can begin transmitting video data corresponding to the requested video to the first user device and the second user device. In some embodiments, the server can transmit the video data to the first user device and the second user device in any suitable manner. For example, in some embodiments, the video data can be transmitted via a communication network, as shown in and described below in connection with FIG. 3.

At 108, the first user device can store the received video data in a buffer of the first user device. Similarly, at 110, the second user device can store the received video data in a buffer of the second user device.

At 112, the first user device can determine whether a predetermined amount of video data has been buffered. In some embodiments, the predetermined amount of video data can be any suitable amount of data. For example, in some embodiments, the predetermined amount of video data can correspond to a particular number of kilobytes of data, a particular duration of the video (e.g., five seconds, ten seconds, thirty seconds, two minutes, and/or any other duration of the video), and/or any other suitable amount of video data. Similarly, at 114, the second user device can determine whether the predetermined amount of video data has been buffered on the second user device. Note that, in some embodiments, the first user device and the second user device can each determine whether the same predetermined amount of video data has been buffered on each device.

If, at 112, the first user device determines that the predetermined amount of video data has not been buffered ("no" at 112), the first user device can loop back to 108 and can continue to store received video data in the buffer of the first user device. Similarly, if, at 114, the second user device determines that the predetermined amount of video data has not been buffered ("no" at 114), the second user device can loop back to 110 and can continue storing the received video data in the buffer of the second user device.

If, at 112, the first user device determines that the predetermined amount of video data has been buffered by the first user device ("yes" at 112), the first user device can proceed to 116 and can transmit a message to the server indicating that the first user device has buffered the predetermined amount of video. Similarly, if, at 114, the second user device determines that the predetermined amount of video has been buffered by the second user device ("yes" at 114), the second user device can proceed to 118 and can transmit a message to the server indicating that the second user device has buffered the predetermined amount of video. Note that, in some embodiments, any suitable information can be included in the messages transmitted by the first user device and the second user device, as described below in more detail in connection with FIG. 2.

At 120, the server can determine if all user devices included in the synchronized media playback session (e.g., the first user device and the second user device, in the example shown in FIG. 1) have buffered the predetermined amount of video data. For example, in some embodiments, the server can determine whether it has received messages indicating that the predetermined amount of video data have been buffered from all user devices included in the synchronized media playback session.

If, at 120, the server determines that a device included in the synchronized playback session has not yet buffered the predetermined amount of video data ("no" at 120), the server can transmit responses to any user devices that have transmitted messages indicating they have buffered the predetermined amount of video data. In particular, the server can transmit a response that instructs user devices that have buffered the predetermined amount of video data to wait to begin playback of the video.

In such instances, in response to receiving a response from the server to wait to begin playback of the video, a user device can re-transmit the message that the predetermined amount of video data has been buffered to the server after any suitable delay. For example, in some embodiments, a user device can transmit the message to the server at any suitable frequency (e.g., once per second, twice per second, and/or any other suitable frequency). As a more particular example, in response to receiving a response from the server to wait to begin playback, the first user device can loop back to block 116. As another more particular example, in response to receiving a response from the server to wait to begin playback, the second user device can loop back to block 118. For example, in response to receiving an instruction from the server to wait to begin playback of the video, a user device can continue to store video data in the buffer of the user device (e.g., until the buffer has been filled to the capacity of the buffer).

Conversely, if, at 120, the server determines that all user devices included in the synchronized media playback session have buffered the predetermined amount of video data, the server can transmit 124 instructions to all of the user devices to begin playback of the video. For example, the server can transmit an instruction to all of the user devices in the synchronized media playback session to begin playback of the video. In another example, the server can transmit an instruction to all of the user devices in synchronized media playback session to being playback of the video at a particular clock time. In some embodiments, the server can continue transmitting video data corresponding to the video, and the user devices can continue buffering the received video data during playback of the video.

In some embodiments, the first user device and the second user device can cause the synchronized playback session to begin in any suitable manner. For example, in some embodiments, presentation of the video can begin in any suitable type of video player window. In some embodiments, any suitable indication of other user devices included in the synchronized playback session can be presented in connection with presentation of the video. For example, in some embodiments, usernames of users associated with other user devices included in the synchronized playback session and/or icons associated with users associated with other user devices included in the synchronized playback session can be presented.

In some embodiments, a synchronized media playback session can allow a user device participating in the session to interact with presentation of media content in the session and/or with other user devices participating in the session in any suitable manner. For example, as described above, in some embodiments, a user device can cause playback of a media content item to be paused on all user devices participating in the session. As another example, in some embodiments, a user device can cause playback of a media content item to jump or skip to a different playback position on all user devices. As yet another example, in some embodiments, a user device can cause a different media content item to begin being presented. As still another example, in some embodiments, a user device can transmit a message to be presented on all user devices presenting in the session, for example, as an instant message, as a message in a group chat, and/or in any other suitable manner.

Figure 2:
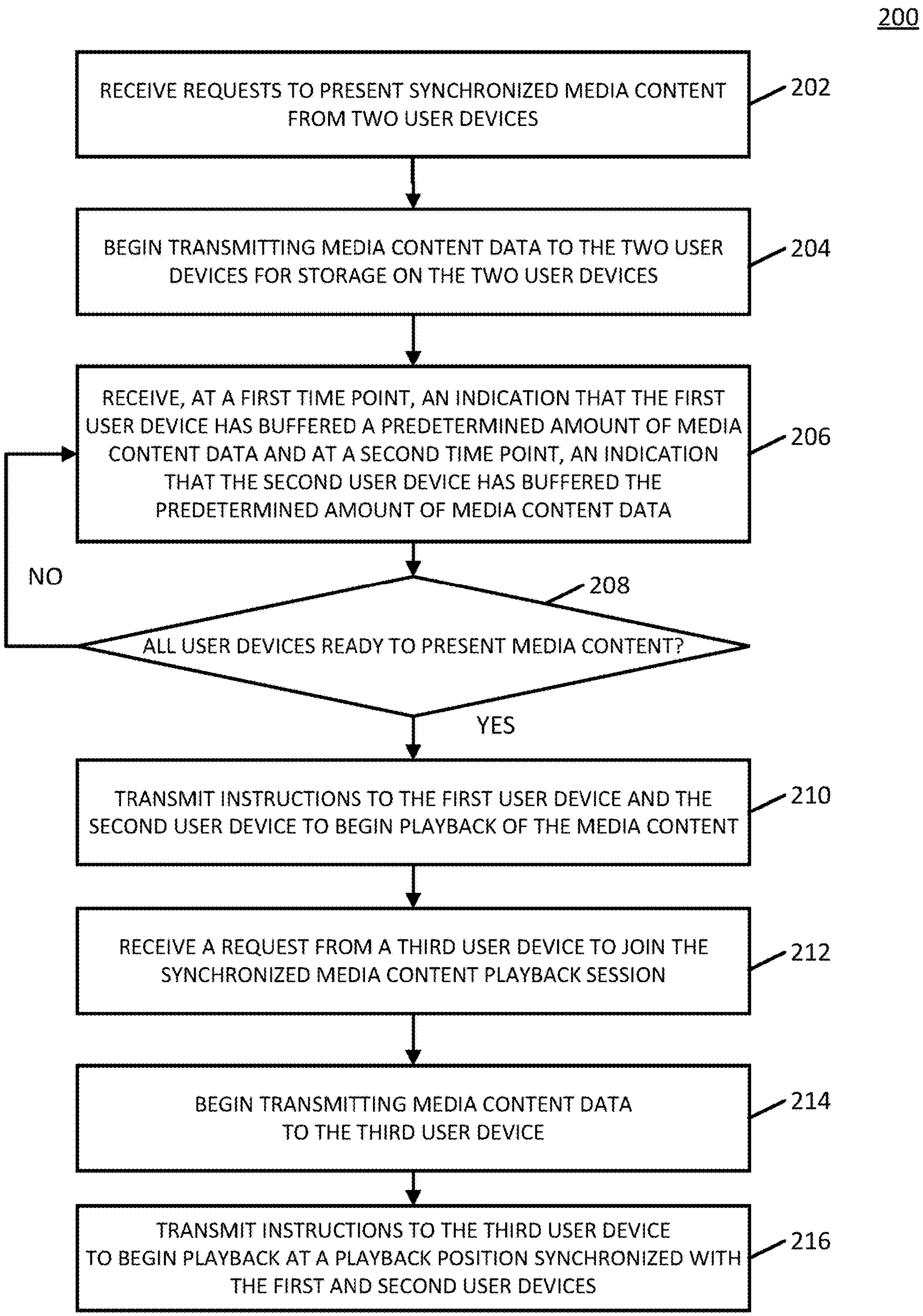
FIG. 2 shows an example of a process for synchronized media content playback on multiple devices in accordance with some embodiments of the disclosed subject matter.

Turning to FIG. 2, an example 200 of a process for synchronized media content playback on multiple devices is shown in accordance with some embodiments of the disclosed subject matter. In some embodiments, blocks of process 200 can be executed on a server, such as a server 302 as shown in and described below in connection with FIG. 3.

Process 200 can begin at 202 by receiving requests to present synchronized media content from two or more user devices. Note that, in some embodiments, the requests can be received in any suitable order, and with any suitable timing between received requests. In some embodiments, each request can be a request from a user device that transmitted the request to initiate a synchronized media playback session. In some embodiments, a request can include any suitable information, such as an identity of a particular media content item to be presented in the synchronized media playback session, identities of other user devices to be included in the synchronized media playback session and/or invited to join the synchronized media playback session, and/or any other suitable information.

Process 200 can begin transmitting media content data corresponding to a media content item to be presented in the synchronized media playback session to the two or more user devices at 204. In some embodiments, process 200 can transmit the media content data using any suitable technique or combination of techniques. For example, in some embodiments, a server that received the requests at block 202 and/or that stores the media content data can transmit the media content data to each of the two or more user devices. As described above in connection with blocks 108 and 110 of FIG. 1, each of the two or more user devices can store the received media content data, for example, in a buffer of each user device.

Figure 3:
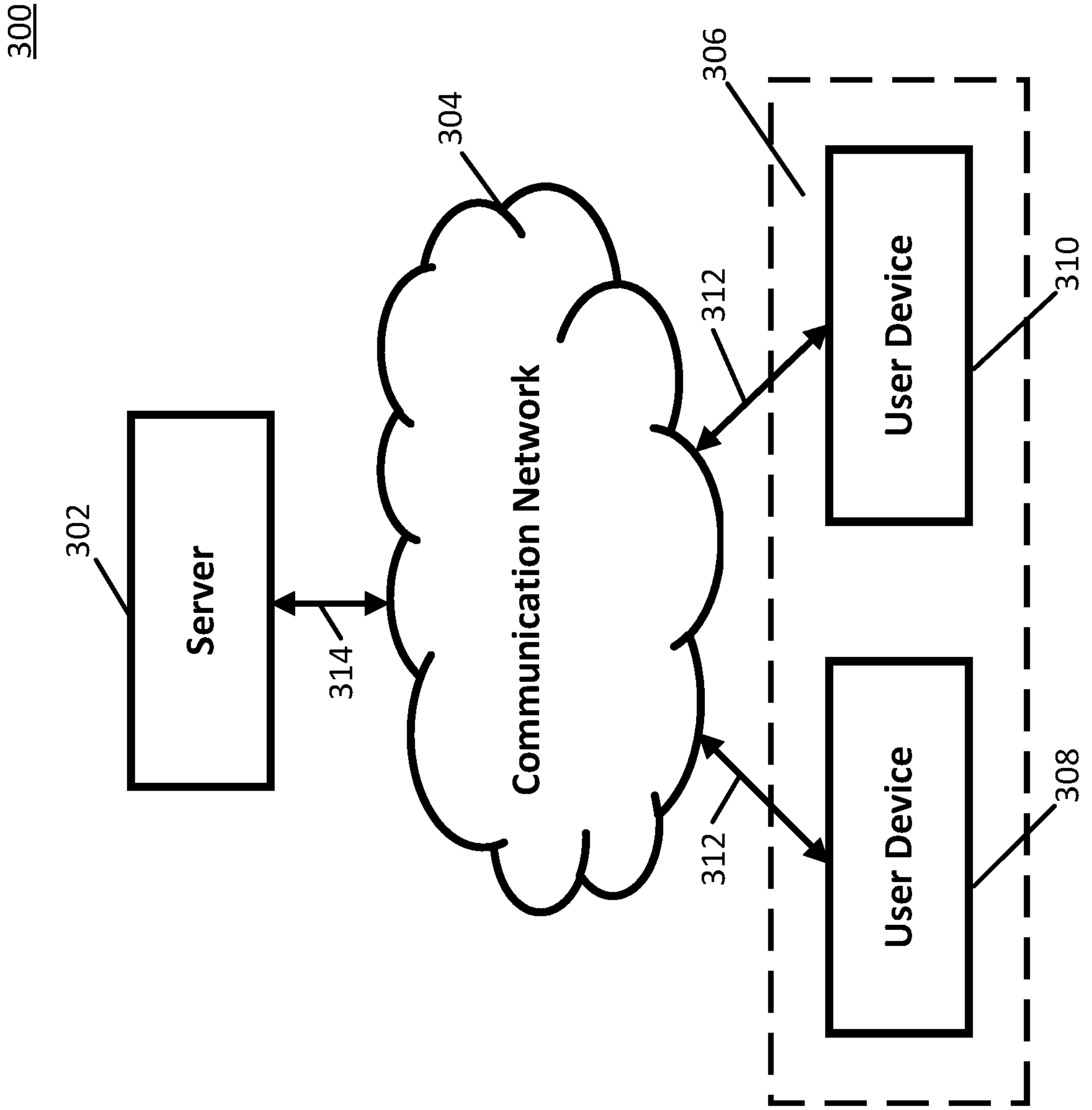
FIG. 3 shows a schematic diagram of an illustrative system suitable for implementation of mechanisms described herein for synchronized media content playback on multiple devices in accordance with some embodiments of the disclosed subject matter.

Process 200 can receive an indication from at least one user device of the two or more user devices that the at least one user device has buffered a predetermined amount of media content data at 206. As described above in connection with blocks 112 and 114 of FIG. 1, the predetermined amount of media content data can include any suitable amount of data (e.g., a predetermined number of kilobytes of data, an amount of data corresponding to a predetermined duration of time of the media content item, and/or any other suitable amount). In some embodiments, the indication can include any suitable information. For example, in some embodiments, the indication can include an indication of an amount of time required to buffer the predetermined amount of media content data. As another example, in some embodiments, the indication can include information about the user device, such as a type of device (e.g., a mobile device, a smart television, and/or any other suitable type of device), information about a display of the device (e.g., a size of the display, an orientation of a display or video player window, and/or any other suitable display information), and/or any other suitable device information (e.g., buffer capacity information, device state information, etc.). As yet another example, in some embodiments, the indication can include information about a network connection between the user device and a server associated with process 200 (e.g., server 302 as shown in FIG. 3), such as a bandwidth of a network connection, latency information associated with the network connection, and/or any other suitable information about the network connection.

At 208, process 200 can determine whether all of the user devices that transmitted requests to join the synchronized media playback session have buffered the predetermined amount of media content data. For example, in some embodiments, process 200 can determine process 200 has received an indication from each of the user devices that the user device has buffered the predetermined amount of media content data, as described above in connection with block 206. Additionally or alternatively, process 200 can transmit a query to each of the user devices in the synchronized media playback session that asks whether the predetermined amount of media content data has been buffered by a user device, where the user device is instructed to wait to initiate the playback of the media content item until receiving a start instruction from the server.

If, at 208, process 200 determines that not all of the user devices have buffered the predetermined amount of media content data (that is, at least one user device has not buffered the predetermined amount of media content data), process 200 can loop back to block 206 and can continue to receive indications from user devices that the user device has buffered the predetermined amount of media content data. Note that, in some embodiments, process 200 can receive indications from each user device at any suitable time points, and with any suitable delay between indications from different user devices. For example, in some embodiments, process 200 can receive an indication from a first user device that the first user device has buffered the predetermined amount of media content data at a first time point, and can receive an indication from a second user device that the second user device has buffered the predetermined amount of media content data at a second time point. Additionally, note that, in some embodiments, process 200 can receive multiple indications from a user device that has buffered the predetermined amount of media content data. For example, in some embodiments, a user device can repeatedly transmit an indication to process 200 (e.g., once per second, twice per second, and/or at any other suitable frequency). In some embodiments, process 200 can transmit a response to a user device that has buffered the predetermined amount of media content data to wait to begin presentation of the media content in response to determining that not all of the user device have buffered the predetermined amount of media content data.

In some embodiments, process 200 can determine that a given amount of time has elapsed in which at least one user device has yet to provide an indication that the user device has buffered the predetermined amount of media content data. In such an embodiment, process 200 can prompt the other user devices as to whether the user device should be removed from the synchronized media playback session. For example, a video window associated with the synchronized media playback session that is presented on each of the other user devices can present a notification prompting a user of a user device to indicate whether to remove the user device that has yet to buffer the predetermined amount of media content data from the synchronized media playback session. In another example, a voting interface can be presented on each of the other user devices and, in response to receiving a particular number of votes to remove the user device that has not buffered the predetermined amount of media content item (e.g., a majority), process 200 can remove that user device from the synchronized media playback session. Additionally or alternatively, in response to determining that a threshold amount of time has elapsed in which at least one user device has yet to provide an indication that it has stored a predetermined amount of media content item in its buffer, process 200 can automatically remove that user device from the synchronized media playback session and can instruct the remaining user devices to begin playing back the media content item.

If, at 208, process 200 determines that all of the user devices have buffered the predetermined amount of media content data ("yes" at 208), process 200 can proceed to block 210 and can transmit instructions to the two or more user devices to begin synchronized playback of the media content item. For example, in some embodiments, the instructions can indicate that the two or more user devices can immediately begin playback of the media content item. As another example, in some embodiments, the instructions can indicate that the two or more user devices can begin playback of the media content item at a time in the future (e.g., at a time one second from a current time, at a time five seconds from a current time, at a time one minute from a current time, and/or at any other suitable future time).

Note that, in some embodiments, process 200 can continue sending additional media content data to each of the user devices to be buffered by each of the user devices during presentation of the media content item. Additionally, in some embodiments, process 200 can receive interactions from each of the user devices to manipulate playback of the media content (e.g., to pause playback on all devices participating in the session, to change a playback position, and/or manipulate playback in any other suitable manner). In some such embodiments, in response to receiving a request to manipulate playback from a user device, process 200 can transmit instructions to all user devices participating in the synchronized media playback session to manipulate playback in the same manner and at the same time, thereby maintaining synchrony of the presentation of the media content.

Additionally, note that, in some embodiments, process 200 can receive updated information about one, some, or all of the respective network connections between the user devices and a server associated with process 200 and/or updated information about a buffer on one, some, or all of the user devices. For example, in some embodiments, process 200 can receive updated network connection information indicating an updated bandwidth, an updated connection speed, an updated network condition, and/or any other suitable connection information. As another example, in some embodiments, process 200 can receive updated information indicating a current size of a buffer on one, some, or all of the user devices. As a more particular example, in some embodiments, process 200 can receive information from a user device indicating that a particular amount of media content data is currently stored in the buffer of the user device (e.g., a particular duration of the media content item, a particular number of kilobytes of data, and/or any other suitable amount of media content data).

At 212, process 200 can receive a request from a third user device (that is, a user device other than the two or more user devices described above in blocks 202-210) to join the synchronized media playback session. In some embodiments, the request can include any suitable information, such as an identifier associated with the synchronized media playback sessions, identifiers of the two or more user devices currently participating in the synchronized playback session, information indicating a quality of a network connection of the third user device, and/or any other suitable information. Note that, in some embodiments, the request from the third user device can be received at any suitable time point after the synchronized playback session has started with the two or more user devices.

At 214, process 200 can begin transmitting media content data to the third user device to be buffered on the third user device, thereby allowing the third user device to join the synchronized media playback session. In some embodiments, process 200 can begin transmitting media content data to the third user device that corresponds to any suitable playback position. For example, in some embodiments, process 200 can begin transmitting media content data that corresponds to a future playback position (e.g., five seconds after a current playback position, ten seconds after a future playback position, and/or any other suitable future playback position). As another example, in some embodiments, process 200 can begin transmitting media content data from a current playback position. In some such embodiments, process 200 can then receive information from the third user device indicating a buffering rate (e.g., based on a quality of a network connection between a server associated with process 200 and the third user device, and/or based on any other suitable information), and can then predict a future playback position based on the buffering rate. As a more particular example, in some embodiments, process 200 can determine a future playback position that corresponds to a playback position of the other user devices in the synchronized media playback session at a time point when the third user device will have buffered a predetermined amount of media content data at the buffering rate. In some embodiments, process 200 can then begin transmitting media content data corresponding to the future playback position.

At 216, process 200 can transmit instructions to the third user device to begin playback of the media content item in synchrony with the other user devices in the synchronized media playback session. In some embodiments, process 200 can transmit the instructions at any suitable time point and based on any suitable information. For example, in some embodiments, process 200 can receive an indication from the third user device that the third user device has buffered a predetermined amount of media content data (e.g., as described above in connection with block 206), and, in response to receiving the indication from the third user device, process 200 can determine a current playback position of the other user devices participating in the synchronized media playback session. In some such embodiments, process 200 can then transmit the current playback position to the third user device in the transmitted instructions, and the third user device can begin presenting the media content item from the indicated playback position in response to determining that the playback position is included in the media content data buffered by the third user device.

Note that, in some embodiments, process 200 can use any other suitable techniques to maintain synchrony among user devices participating in the synchronized media playback session. For example, in an instance where a user device participating in the synchronized media playback session pauses playback in order to buffer additional media content data, process 200 can alter a playback speed for the user device that paused playback and/or the other user devices participating in the synchronized playback session. As a more particular example, in some embodiments, process 200 can speed up playback for the user device that paused and resumed playback to buffer additional media content data, thereby allowing the user device to catch up to the other user devices in the synchronized media playback session. As another more particular example, in some embodiments, process 200 can slow down playback for the other user devices participating in the synchronized media playback session, thereby causing the other user devices to allow the user devices that paused playback to catch up in the synchronized media playback session. Note that, in some embodiments, process 200 can cause a playback speed to be altered for one or more user devices participating in the synchronized media playback session based on any suitable criteria. For example, in some embodiments, process 200 can alter a playback speed in response to determining that a user device is more than a predetermined duration of time (e.g., more than two seconds, more than five seconds, and/or any other suitable duration of time) out of synchrony with other user devices participating in the session.

It should be noted that process 200 can adjust the rate of delivery of the media content data to a user device based on the information received from the user device and based on the information received from the other user devices in the synchronized media playback session. Aspects of the present disclosure provide coordinated rate control during streaming of a video content item to multiple client devices.

Turning to FIG. 3, an example 300 of hardware for presenting synchronized media content that can be used in accordance with some embodiments of the disclosed subject matter is shown. As illustrated, hardware 300 can include a server 302, a communication network 304, and/or one or more user devices 306, such as user devices 308 and 310. For example, multiple user devices 306 including user devices 308 and 310 can participate in a synchronized media playback session managed by one or more servers 302 over communication network 304. In another example, server 302 can be configured to provide the media content in the synchronized media playback session to one or more user devices 306, such as user devices 308 and 310, and can also be configured to handle the synchronization features in the synchronized media playback session. In yet another example, a first server 302 can be configured to provide the media content in the synchronized media playback session to one or more user devices 306 and a second server 302 can be configured to handle the synchronized media playback session.

Server 302 can be any suitable server(s) for storing information, data, and/or media content. For example, in some embodiments, server 302 can store media content items, which can be transmitted to user devices 306 for presentation. In some such embodiments, the media content items can include any suitable types of media content, such as videos, movies, television programs, live-streamed content, audio content (e.g., music, audiobooks, radio programs, and/or any other suitable audio content), and/or any other suitable type of media content. As another example, in some embodiments, server 302 can coordinate synchronized playback of media content on multiple user devices 306, as described above in connection with FIGS. 1 and 2. As a more particular example, in some embodiments, server 302 can receive requests from multiple user devices to initiate playback of a media content item in a synchronized media playback session, and can instruct the user devices to begin playback of the media content item in response to determining that all of the user devices have buffered a predetermined amount of media content data, as described above in connection with FIG. 2.

Communication network 304 can be any suitable combination of one or more wired and/or wireless networks in some embodiments. For example, communication network 304 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 206 can be connected by one or more communications links (e.g., communications links 312) to communication network 304 that can be linked via one or more communications links (e.g., communications links 314) to server 302. The communications links can be any communications links suitable for communicating data among user devices 306 and server 302 such as network links, dial-up links, wireless links, hard-wired links, any other suitable communications links, or any suitable combination of such links.

User devices 306 can include any one or more user devices suitable for presenting media content and/or participating in a synchronized media playback session. For example, in some embodiments, user devices 306 can include a mobile phone, a tablet computer, a smart television, a media player, a desktop computer, a vehicle entertainment system, a wearable computer, and/or any other suitable type of user device.

Although server 302 is illustrated as one device, the functions performed by server 302 can be performed using any suitable number of devices in some embodiments. For example, in some embodiments, multiple devices can be used to implement the functions performed by server 302.

Although two user devices 308 and 310 are shown in FIG. 3 to avoid over-complicating the figure, any suitable number of user devices, and/or any suitable types of user devices, can be used in some embodiments.

Figure 4:
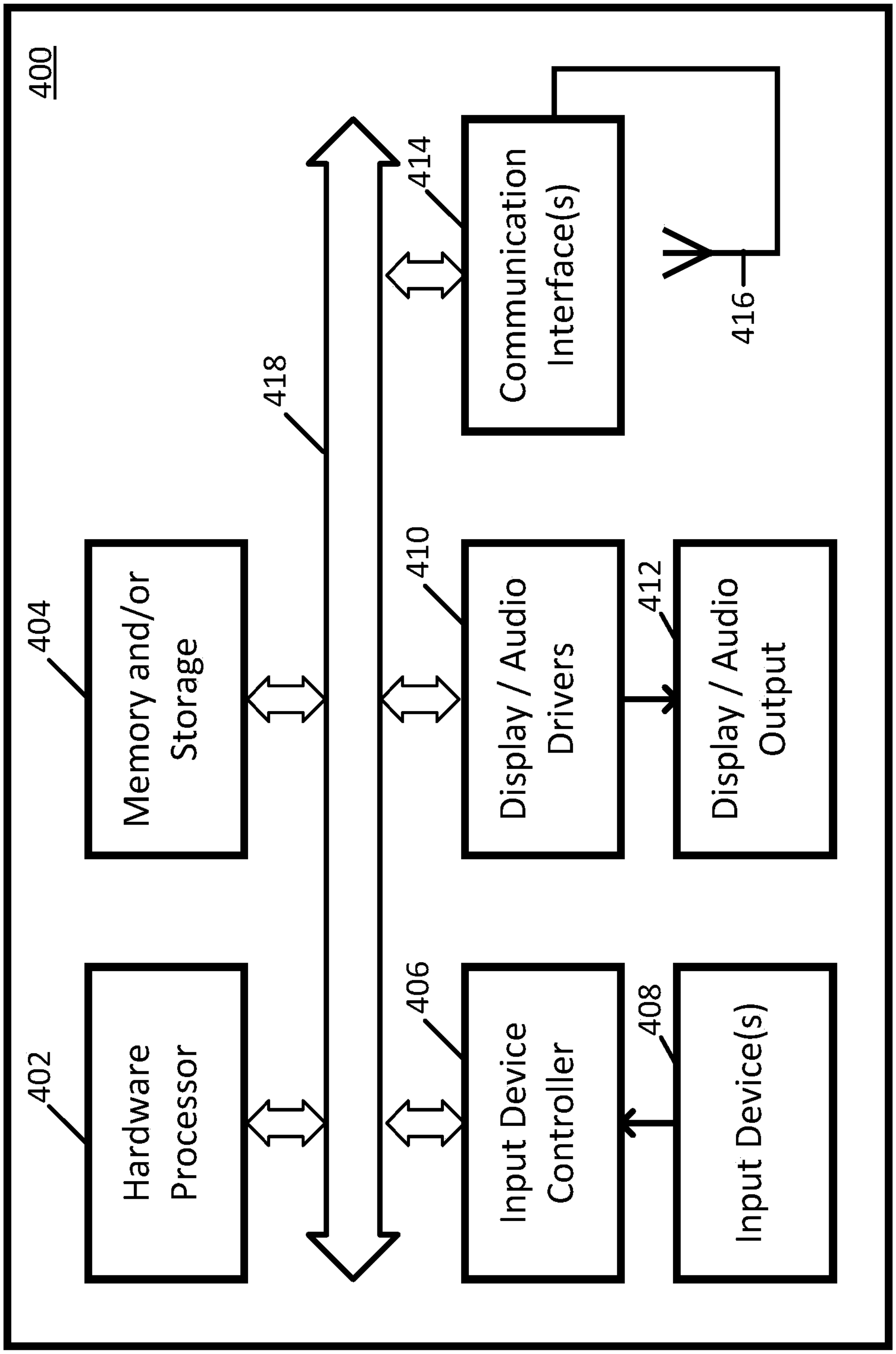
FIG. 4 shows a detailed example of hardware that can be used in a server and/or a user device of FIG. 3 in accordance with some embodiments of the disclosed subject matter.

Server 302 and user devices 306 can be implemented using any suitable hardware in some embodiments. For example, in some embodiments, devices 302 and 306 can be implemented using any suitable general purpose computer or special purpose computer. For example, a mobile phone may be implemented using a special purpose computer. Any such general purpose computer or special purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 402 can be controlled by a server program stored in memory and/or storage of a server, such as server 402. For example, in some embodiments, the server program can cause hardware processor 402 to receive a request to coordinate a synchronized media content viewing session, determine whether multiple user devices are ready to begin the synchronized media content viewing session, transmit instructions to user devices to begin a synchronized media content viewing session, and/or perform any other suitable functions. In some embodiments, hardware processor 402 can be controlled by a computer program stored in memory and/or storage 404 of user device 306. For example, the computer program can cause hardware processor 402 to store received media content data in a buffer of user device 306, transmit a message to server 302 in response to determining that a predetermined amount media content data has been buffered, present media content as part of a synchronized media content playback session, and/or perform any other suitable functions.

Memory and/or storage 404 can be any suitable memory and/or storage for storing programs, data, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks (e.g., computer network 304). For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 304) in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

In some embodiments, at least some of the above described blocks of the processes of FIGS. 1 and 2 can be executed or performed in any order or sequence not limited to the order and sequence shown in and described in connection with the figures. Also, some of the above blocks of FIGS. 1 and 2 can be executed or performed substantially simultaneously where appropriate or in parallel to reduce latency and processing times. Additionally or alternatively, some of the above described blocks of the processes of FIGS. 1 and 2 can be omitted. For example, a method as described with reference to blocks 212, 214 and 216 of FIG. 3 could in principle be applied in the case of a further user device joining a synchronized media playback session in which two or more user devices are already participating, even if the synchronized media playback session had not been initiated as described with reference to blocks 202 to 210 of FIG. 3.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for presenting synchronized media content are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. For example, a feature described with reference to one aspect or embodiment may be applied with any other aspect or embodiment. Features of the disclosed embodiments can be combined and rearranged in various ways.

What is claimed is:

1. A method for synchronizing playback of media content, the method comprising:

receiving, using a server that includes a hardware processor, a first request of a first user device of a first user to concurrently watch a media item with at least one second user of a second user device;

receiving, at a first time point, a first communication from the first user device to begin presenting the media item on the first user device;

receiving, at a second time point, a second communication from the second user device to begin presenting the media item on the second user device;

in response to receiving the first communication and the second communication, initiating a synchronized media playback session by transmitting instructions to the first user device and to the second user device that cause the first user device and the second user device to begin presenting the media item in synchronization;

receiving a first request of the second user to pause playback of the media item on the second user device;

in response to the first request of the second user, causing a rate of delivery of the media item to the second user device to be changed from a first rate of delivery to a second rate of delivery;

receiving a second request of the second user to resume playback of the media item on the second user device; and in response to the second request of the second user, causing the second rate of delivery of the media item to the second user device to be changed to a third rate of delivery to allow the second user device to catch up to the first user device in the synchronized media playback session.

2. The method of claim 1, further comprising:

receiving a second request of the first user to present a message of the first user in a group chat; and in response to the second request of the first user, presenting the message of the first user in the group chat on the second user device during the synchronized media playback session.

3. The method of claim 1, wherein causing the second rate of delivery of the media item to the second user device to be changed to the third rate of delivery further comprises transmitting, from the server to the second user device, instructions to modify playback of the media item for a predetermined duration of time to catch up in the synchronized media playback session with the first user device.

4. The method of claim 1, further comprising:

receiving, from a third user device, after transmitting instructions to the first user device and the second user device that cause the first user device and the second user device to begin presenting the media item, a communication to join presentation of the media item;

determining a playback position from which the third user device is to begin presentation of the media item, wherein the first user device and the second user device have not yet reached the playback position; and transmitting instructions to the third user device to begin presentation of the media item from the playback position at a specified time in response to receiving an indication from the third user device that a predetermined amount of media data that corresponds to media content after the playback position has been buffered by the third user device.

5. The method of claim 1, further comprising:

in response to determining that the first user device has buffered a predetermined amount of media data and in response to determining that the second user device has not buffered the predetermined amount of the media data, transmitting a message to the first user device indicating that the presenting of the media item is not to begin.

6. The method of claim 1, further comprising:

receiving, from the first user device, an indication that additional media data is to be buffered by the first user device;

transmitting the additional media data to the first user device; and transmitting instructions to the first user device to speed up playback of the media item for a predetermined duration of time.

7. The method of claim 1, further comprising:

receiving, from the first user device, an indication that additional media data is to be buffered by the first user device;

transmitting the additional media data to the first user device; and transmitting instructions to the second user device to slow down playback of the media item for a predetermined duration of time.

8. The method of claim 1, further comprising:

receiving an indication that a rate change has occurred on at least one of the first user device or the second user device based on buffering rate information; and upon receiving the indication that the rate change has occurred on at least one of the first user device or the second user device:

transmitting, from the server to the first user device or the second user device associated with the indication, instructions to modify a rate of delivery of the media item for a predetermined duration of time to maintain the synchronized media playback session.

9. A system for synchronizing playback of media content, the system comprising:

a memory; and a hardware processor, coupled to the memory, to perform operations comprising:

receiving a first request of a first user device of a first user to concurrently watch a media item with at least one second user of a second user device;

receiving, at a first time point, a first communication from the first user device to begin presenting the media item on the first user device;

receiving, at a second time point, a second communication from the second user device to begin presenting the media item on the second user device;

in response to receiving the first communication and the second communication, initiating a synchronized media playback session by transmitting instructions to the first user device and to the second user device that cause the first user device and the second user device to begin presenting the media item in synchronization;

receiving a first request of the second user to pause playback of the media item on the second user device;

in response to the first request of the second user, causing a rate of delivery of the media item to the second user device to be changed from a first rate of delivery to a second rate of delivery;

receiving a second request of the second user to resume playback of the media item on the second user device; and in response to the second request of the second user, causing the second rate of delivery of the media item to the second user device to be changed to a third rate of delivery to allow the second user device to catch up to the first user device in the synchronized media playback session.

10. The system of claim 9, the operations further comprising:

receiving a second request of the first user to present a message of the first user in a group chat; and in response to the second request of the first user, presenting the message of the first user in the group chat on the second user device during the synchronized media playback session.

11. The system of claim 9, wherein causing the second rate of delivery of the media item to the second user device to be changed to the third rate of delivery further comprises transmitting, from a server to the second user device, instructions to modify playback of the media item for a predetermined duration of time to catch up in the synchronized media playback session with the first user device.

12. The system of claim 9, the operations further comprising:

receiving, from a third user device, after transmitting instructions to the first user device and the second user device that cause the first user device and the second user device to begin presenting the media item, a communication to join presentation of the media item;

determining a playback position from which the third user device is to begin presentation of the media item, wherein the first user device and the second user device have not yet reached the playback position; and transmitting instructions to the third user device to begin presentation of the media item from the playback position at a specified time in response to receiving an indication from the third user device that a predetermined amount of media data that corresponds to media content after the playback position has been buffered by the third user device.

13. The system of claim 9, the operations further comprising:

in response to determining that the first user device has buffered a predetermined amount of media data and in response to determining that the second user device has not buffered the predetermined amount of the media data, transmitting a message to the first user device indicating that the presenting of the media item is not to begin.

14. The system of claim 9, the operations further comprising:

receiving, from the first user device, an indication that additional media data is to be buffered by the first user device;

transmitting the additional media data to the first user device; and transmitting instructions to the first user device to speed up playback of the media item for a predetermined duration of time.

15. The system of claim 9, the operations further comprising:

receiving, from the first user device, an indication that additional media data is to be buffered by the first user device;

transmitting the additional media data to the first user device; and transmitting instructions to the second user device to slow down playback of the media item for a predetermined duration of time.

16. The system of claim 9, the operations further comprising:

receiving an indication that a rate change has occurred on at least one of the first user device or the second user device based on buffering rate information; and upon receiving the indication that the rate change has occurred on at least one of the first user device or the second user device:

transmitting, from a server to the first user device or the second user device associated with the indication, instructions to modify a rate of delivery of the media item for a predetermined duration of time to maintain the synchronized media playback session.

17. A non-transitory computer-readable medium containing computer executable instructions that, when executed by a processor, cause the processor to perform operations for synchronizing playback of media content, the operations comprising:

receiving a first request of a first user device of a first user to concurrently watch a media item with at least one second user of a second user device;

receiving, at a first time point, a first communication from the first user device to begin presenting the media item on the first user device;

receiving, at a second time point, a second communication from the second user device to begin presenting the media item on the second user device;

in response to receiving the first communication and the second communication, initiating a synchronized media playback session by transmitting instructions to the first user device and to the second user device that cause the first user device and the second user device to begin presenting the media item in synchronization;

receiving a first request of the second user to pause playback of the media item on the second user device;

in response to the first request of the second user, causing a rate of delivery of the media item to the second user device to be changed from a first rate of delivery to a second rate of delivery;

receiving a second request of the second user to resume playback of the media item on the second user device; and in response to the second request of the second user, causing the second rate of delivery of the media item to the second user device to be changed to a third rate of delivery to allow the second user device to catch up to the first user device in the synchronized media playback session.

18. The non-transitory computer-readable medium of claim 17, the operations further comprising:

receiving a second request of the first user to present a message of the first user in a group chat; and in response to the second request of the first user, presenting the message of the first user in the group chat on the second user device during the synchronized media playback session.

19. The non-transitory computer-readable medium of claim 17, wherein causing the second rate of delivery of the media item to the second user device to be changed to the third rate of delivery further comprises transmitting, from a server to the second user device, instructions to modify playback of the media item for a predetermined duration of time to catch up in the synchronized media playback session with the first user device.

20. The non-transitory computer-readable medium of claim 17, the operations further comprising:

receiving, from a third user device, after transmitting instructions to the first user device and the second user device that cause the first user device and the second user device to begin presenting the media item, a communication to join presentation of the media item;

determining a playback position from which the third user device is to begin presentation of the media item, wherein the first user device and the second user device have not yet reached the playback position; and transmitting instructions to the third user device to begin presentation of the media item from the playback position at a specified time in response to receiving an indication from the third user device that a predetermined amount of media data that corresponds to media content after the playback position has been buffered by the third user device.

* * * * *